US010968505B2

(12) United States Patent
Kato et al.

(10) Patent No.: US 10,968,505 B2
(45) Date of Patent: Apr. 6, 2021

(54) PROCESS FOR PRODUCING MOLDED MATERIAL, MOLDED MATERIAL, WAVEFRONT CONTROL ELEMENT AND DIFFRACTION GRATING

(71) Applicant: TOHOKU UNIVERSITY, Sendai (JP)

(72) Inventors: Hidemi Kato, Sendai (JP); Wataru Yashiro, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 475 days.

(21) Appl. No.: 15/738,929

(22) PCT Filed: Jun. 17, 2016

(86) PCT No.: PCT/JP2016/068182
§ 371 (c)(1),
(2) Date: Dec. 21, 2017

(87) PCT Pub. No.: WO2016/208517
PCT Pub. Date: Dec. 29, 2016

(65) Prior Publication Data
US 2018/0187294 A1 Jul. 5, 2018

(30) Foreign Application Priority Data
Jun. 22, 2015 (JP) ............................. JP2015-124336

(51) Int. Cl.
C22C 45/00 (2006.01)
G01N 23/20 (2018.01)
(Continued)

(52) U.S. Cl.
CPC ............... *C22F 1/002* (2013.01); *C22C 5/04* (2013.01); *C22C 28/00* (2013.01); *C22C 30/02* (2013.01);
(Continued)

(58) Field of Classification Search
None
See application file for complete search history.

(56) References Cited

U.S. PATENT DOCUMENTS 9,044,800 B2 * 6/2015 Johnson .................... C22F 1/00
2008/0099175 A1 5/2008 Chu et al.
(Continued)

FOREIGN PATENT DOCUMENTS

JP H07-26354 A 1/1995
JP H09-316565 A 12/1997
(Continued)

OTHER PUBLICATIONS

Feb. 7, 2019 Office Action issued in European Patent Application No. 16814288.3.
(Continued)

*Primary Examiner* — George Wyszomierski
(74) *Attorney, Agent, or Firm* — Oliff PLC

(57) ABSTRACT

A process for producing a molded material that can form metallic glass material in a state of lower viscosity, and can manufacture a small structure of several 10 μm or less in a comparatively short time while precisely controlling shape thereof, by the process comprising a heating step of heating supercooled state metallic glass material or a solid metallic glass material at a temperature increase rate of 0.5 K/s to a temperature at or higher than a temperature at which a crystallization process for a supercooled liquid of the metallic glass material begins, and a molding step of transfer molding the metallic glass material until the crystallization process for the supercooled liquid of the metallic glass material has been completed. In addition, the purpose is also
(Continued)

to provide the molded material that has been formed by this process, a wavefront control element, and a diffraction grating.

4 Claims, 9 Drawing Sheets

(51) Int. Cl.
  C22F 1/00       (2006.01)
  C22C 5/04       (2006.01)
  C22C 28/00      (2006.01)
  C22C 30/02      (2006.01)
  C22F 1/14       (2006.01)
  C22F 1/16       (2006.01)
  C22F 1/10       (2006.01)
  G21K 1/06       (2006.01)

(52) U.S. Cl.
  CPC ............ *C22C 45/00* (2013.01); *C22C 45/003* (2013.01); *C22F 1/10* (2013.01); *C22F 1/14* (2013.01); *C22F 1/16* (2013.01); *G01N 23/20* (2013.01); *G21K 1/06* (2013.01); *C22F 1/00* (2013.01)

(56) References Cited

U.S. PATENT DOCUMENTS

| 2012/0103478 A1 | 5/2012 | Johnson et al. |
| 2014/0053606 A1* | 2/2014 | Fukushima ......... C23C 14/0036 65/102 |

FOREIGN PATENT DOCUMENTS

| JP | 2005121730 A | * | 5/2005 |
| JP | 2013-544648 A | | 12/2013 |
| WO | 2012/112656 A2 | | 8/2012 |
| WO | 2015/066145 A1 | | 5/2015 |

OTHER PUBLICATIONS

Apr. 25, 2018 Extended European Search Report issued in European Patent Application No. 16814288.3.
Sep. 20, 2016 International Search Report issued in International Patent Application No. PCT/JP2016/068182.
Yashiro et al; "A metallic glass grating for X-ray grating interferometers fabricated by imprinting;" Applied Physics Express; 2014; vol. 1; No. 3; pp. 032501-1-032501-3.
Grunzweig et al; "Design, fabrication, and characterization of diffraction gratings for neutron phase contrast imaging;" Review of Scientific Instruments; 2008; 79; pp. 053703-1-053703-6.
Kim et al; "Fabrication and characterization of the source grating for visibility improvement of neutron phase imaging with gratings," Review of Scientific Instruments; 2013; 84; pp. 063705-1-063705-5.
Saotome et al; "Characteristic behavior of La55Al25Ni20 amorphous alloy under rapid heating;" Materials Science and Engineering; 2001; A 304-306; pp. 743-746.
Dec. 26, 2017 International Preliminary Report on Patentability issued in International Patent Application No. PCT/JP2016/068182.

\* cited by examiner (a)

(b)

(a)

(b)

PROCESS FOR PRODUCING MOLDED MATERIAL, MOLDED MATERIAL, WAVEFRONT CONTROL ELEMENT AND DIFFRACTION GRATING

TECHNICAL FIELD

The present invention relates to process for producing molded material, molded materials, wavefront control elements and diffraction gratings.

BACKGROUND ART

It is necessary in e.g., X-ray interferometers and neutron interferometers to precisely control the wavefront of X-rays and neutron beams. For this necessity, wavefront control elements used need to have a precisely controlled accurate shape. The wavefront control elements used in particular for X-ray Talbot interferometers and neutron Talbot interferometers are diffraction gratings. To provide diffraction gratings that have enhanced sensitivity and spatial resolution, diffraction gratings with a shorter period and a highly-precise shape have been demanded.

A diffraction grating for X-ray Talbot interferometers that is conventionally obtained by the present inventors is one made from metallic glass which is produced by subjecting a supercooled Pd-based metallic glass material to transfer molding at a temperature increase rate of 0.33 K/s and as a result has concavity with a depth of about 10 μm and a concavity-convexity period of 8 μm (see, for example, Non-Patent Literature 1). This diffraction grating is produced with reference to an amorphous alloy production process (described in, for example, Patent Literature 1) which involves heating an amorphous alloy material at a temperature increase rate of 100 K/s or more to a temperature falling in a range between a glass transition temperature ($T_g$) and a crystallization temperature ($T_x$), and at the temperature in that range the amorphous alloy material is molded into a supercooled amorphous alloy material, which is then cooled to produce the amorphous alloy.

A process developed for obtaining diffraction gratings for neutron Talbot interferometers involves injecting Gadox (Gd sulfate) powder into a Si substrate grating to allow the powder to penetrate into the substrate grating, followed by solidification, in order to produce a Gadox diffraction grating (see, for example, Non-Patent Literature 2). The diffraction grating obtained by this process has concavity with a depth of 500 μm and a concavity-convexity period of 477 μm.

A process developed for obtaining diffraction gratings with a shorter period involves spraying Gd vapor from upward obliquely onto a Si diffraction grating mold to deposit the Gd vapor on the Si mold in order to produce a Gd diffraction grating (see, for example, Non-Patent Literature 3). The diffraction grating obtained by this process has concavity with a depth of about 11 μm and a concavity-convexity period of about 4 μm.

Meanwhile, in heating a La—Al—Ni-based metallic glass material lying at a supercooled state at a prescribed temperature increase rate, the application of a higher temperature increase rate has been known to lead to a lower minimum viscosity coefficient of the material, i.e., a lower viscosity coefficient of the material lying immediately before arriving at a crystallization temperature (see, for example, Non-Patent Literature 4).

CITATION LIST

Non-Patent Literature

Non-Patent Literature 1: Wataru Yashiro, Daiji Noda, Tadashi Hattori, Kouichi Hayashi, Atsushi Momose, and Hidemi Kato, "A metallic glass grating for X-ray grating interferometers fabricated by imprinting", Applied Physics Express, 2014, 7, 032501

Non-Patent Literature 2: J. Kim, et al., "Fabrication and characterization of the source grating for visibility improvement of neutron phase imaging with gratings", Rev. Sci. Instrum., 2013, 84, 063705

Non-Patent Literature 3: C. Grunzweig, et al., "Design, fabrication, and characterization of diffraction gratings for neutron phase contrast imaging", Rev. Sci. Instrum., 2008, 79, 053703

Non-Patent Literature 4: Saotome et al., "Characteristic behavior of $La_{55}Al_{25}Ni_{20}$ amorphous alloy under rapid heating", Mater. Sci. Eng., A304-306, 2001, p. 743-746

Patent Literature

Patent Literature 1: JP-A-H07-26354

SUMMARY OF THE INVENTION

Technical Problem

Performing the processes described in Non-Patent Literature 1 and Patent Literature 1 to obtain metallic glass diffraction gratings, however, would require a temperature during the molding to be maintained in a range between a glass transition temperature ($T_g$) and a crystallization initiation temperature ($T_{on}$). In other words, the temperature increase needs to end before arriving at the crystallization initiation temperature in order to prevent the metallic glass material from advancing toward crystallization. The application of a higher temperature increase rate together with a higher proximity to the crystallization temperature (crystallization initiation temperature) is known to lead to a lower viscosity coefficient of a supercooled metallic glass material, as described in Non-Patent Literature 4. Thus, to facilitate the molding of metallic glass materials, it would be preferred for the molding to be performed at a higher temperature increase rate with temperature being as close to the crystallization initiation temperature as possible. Yet, the application of a temperature increase rate as high as 100 K/s or more would make it difficult to end the temperature increase at a desired temperature, and shorten a lifetime spanning from the crystallization of the supercooled liquid until its stabilization. In view of this, the attempt to allow the material to avoid its crystallization and maintain a metallic glass state even after the molding operation would make it necessary to end the temperature increase well before the crystallization initiation temperature for the molding operation, for safety reasons, followed by rapidly cooling to a temperature $T_g$ or lower. Hence, the problem with the processes described in Non-Patent Literature 1 and Patent Literature 1 is the need to mold metallic glass materials which still have a higher viscosity coefficient than cases permitting the temperature increase to continue to immediately before the crystallization initiation temperature.

The diffraction grating production process described in Non-Patent Literature 2 can only produce diffraction gratings with a structure measuring hundreds of micrometers at smallest, making it difficult to produce diffraction gratings with a finer structure. While the process of Non-Patent Literature 2 allows for the production of $G_0$ (Source Grating) diffraction gratings, which have a relatively longer concavity-convexity period, this process fails to serve as producing $G_2$ (Analyzer Grating) diffraction gratings, which have a relatively shorter concavity-convexity period.

The diffraction grating production process described in Non-Patent Literature 3 gives diffraction gratings with a short period that are applicable to $G_2$ diffraction gratings for neutron Talbot interferometers, and yet their shape fails to be precisely controlled: the resultant diffraction gratings have convexity with an uneven thickness, possibly causing the interferometers to have a lowered spatial resolution. Another problem with this production process is a prolonged production time ranging from about two days to one week for the production of a single diffraction grating.

The present invention, having focused on such problems as described above, has objects of providing process for producing molded material by which a metallic glass material can be molded at a lower viscosity coefficient and a structure measuring not more than tens of micrometers can be molded with a highly precise shape control in a relatively short period of time; and providing the molded material, a wavefront control element and a diffraction grating.

Solution to Problem

The X-ray and neutron beam absorption capability of the materials of diffraction gratings, for example, is hardly affected by a structure formed by atoms in those materials, i.e., whether the materials have a crystalline state structure or an amorphous state structure. Metallic glass, which normally has superior mechanical properties such as high strength and low Young's modulus, comes to be brittle with the progress of a crystallization process. Hence, practical applications taking advantage of those superior mechanical properties inherent in the metallic glass would require a metallic glass state to be maintained even after the metallic glass undergoes the molding operation. In applications such as diffraction gratings for X-ray interferometers and neutron interferometers, on the other hand, those superior mechanical properties are not necessarily required in use, and therefore, the present inventors have thought, the maintenance of the metallic glass state may be disregarded. Based on this idea, the present inventors have discovered that the attempt to provide the diffraction gratings and such others would be advantageous by letting the crystallization process proceed during the molding operation to utilize a lower viscosity coefficient state during the molding as well as by utilizing, for the molding, a viscous flow deformation obtainable on a large scale for a period of time starting with the initiation of the crystallization process and lasting before the completion of the crystallization process. The present invention has been made based on this discovery.

Specifically, objects described above are attained by a process for producing a molded material according to the present invention, which comprises a step of heating a supercooled metallic glass material to a temperature which is equal to or higher than a temperature at which a supercooled liquid of the metallic glass material starts to crystallize; and a step of molding the metallic glass material, during the heating, for a period of time lasting before a completion of the crystallization process of the supercooled liquid of the metallic glass material, into the material having a mixed phase of metallic glass and a crystalline phase or having a crystalline phase alone.

The process for producing a molded material according to the present invention may comprise a step of heating a solid metallic glass material to a temperature which is equal to or higher than a glass transition temperature of the metallic glass material and is equal to or higher than a temperature at which the metallic glass material starts to crystallize; and a step of molding the metallic glass material, during the heating, for a period of time starting with an arrival at the glass transition temperature and lasting before a completion of the crystallization process of a supercooled liquid of the metallic glass material, into the material having a mixed phase of metallic glass and a crystalline phase or having a crystalline phase alone.

The processes for producing a molded material according to the present invention are based on principle set forth below.

FIG. 1 shows relations between metallic glass material states with respect to temperature and elapsed time of heating. As shown in FIG. 1, a solid metallic glass material, by being heated to a temperature surpassing a glass transition temperature ($T_g$), becomes a supercooled liquid, and by being heated to a temperature surpassing a crystallization initiation temperature ($T_{on}$), starts to crystallize, and is completely crystallized at a crystallization completion temperature ($T_{off}$), eventually giving a crystalline alloy represented by the same composition as that of the metallic glass material. The above excludes effects brought about by factors occurring during the temperature increase/decrease step: impurities such as oxygen mixed unintendedly and constituent elements lost due to e.g., evaporation.

In an instance shown in FIG. 1, the application of a higher temperature increase rate brings about the supercooled state at a glass transition temperature $T_{g,h}$, and allows the crystallization process to start at $T_{on,h}$; and the application of a lower temperature increase rate brings about the supercooled state at a glass transition temperature $T_{g,l}$, and allows the crystallization process to start at $T_{on,l}$ ($<T_{on,h}$). Dispersion of solid particles in viscous fluid caused by the initiation of the crystallization process at $T_{on}$ contributes to the increase in viscosity coefficient, which is, however, surpassed by the decrease in the viscosity coefficient of the remaining supercooled liquid due to the temperature increase, which lowers the viscosity coefficient as a whole. And yet, a further temperature increase causes the increase in volume of the solid particles, leading to the increase in the viscosity coefficient. This increase in the viscosity coefficient equilibrates with the decrease in the viscosity coefficient presented by the remaining supercooled liquid, at a temperature $T_{min}$ (hereinafter, referred to as "minimum viscosity coefficient temperature"), at which a minimum viscosity coefficient $\eta(T_{min})$ is reached. The viscosity coefficient as a whole, even if that temperature is surpassed or maintained, would continue to rise because of a more pronounced contribution made by the increase in volume of the solid particles mentioned above in a longer period of time. Eventually, the completion of the crystallization process terminates the viscous flow, giving a crystalline solid. It is notable here that the increase of the viscosity coefficient lasting from its minimum value toward its higher value is still accompanied by the occurrence of the viscous flow; namely, the viscous molding operation can be continued for a period of time that ends at the completion of the crystallization process.

As described in Non-Patent Literature 4, it is known that supercooled metallic glass materials subjected to a higher temperature have a lower viscosity coefficient. This is because, as shown in FIG. 1, the higher temperature increase rate shifts the glass transition temperature of the material toward the higher temperature/shorter elapsed time side. The same tendency applies to the crystallization initiation temperature $T_{on}$, which is positioned higher than the glass transition temperature, and to the minimum viscosity coefficient temperature $T_{min}$, which is positioned much higher than that. Given $T_{on,h} > T_{on,l}$ and $T_{min,h} > T_{min,l}$, the application of a higher temperature increase rate, rather than the application of a lower temperature increase rate, leads to a lowered viscosity coefficient $\eta(T_{on})$ of the metallic glass material at the crystallization initiation temperature $T_{on}$, and also leads to a lowered minimum viscosity coefficient $\eta(T_{min})$ occurring in the crystallization process.

The process for producing a molded material according to the present invention involves heating a supercooled metallic glass material lying under a temperature which is equal to or higher than its glass transition temperature to a temperature which is equal to or higher than its crystallization initiation temperature, and molding the metallic glass material, at a lower viscosity, for a period of time lasting before the completion of the crystallization process, into the material having a mixed phase of metallic glass and a crystalline phase or having a crystalline phase alone. This configuration enables the molding to be performed with a highly precise shape control, giving rise to a molded material with a fine structure measuring not more than tens of micrometers, such as $G_2$ diffraction gratings for neutron Talbot interferometers and X-ray Talbot interferometers.

The process for producing a molded material according to the present invention requires the metallic glass material to be subjected to the molding operation while the metallic glass material keeps its supercooled state, inevitably shortening the production time. As shown in FIG. 1, in a period of time during which the metallic glass material keeps its supercooled state, $\Delta t_h < \Delta t_l$ is fulfilled wherein $\Delta t_h$ is a period of time passed in the case of the application of a higher temperature increase rate (period of time passed until the arrival at crystallization completion temperature $T_{off,h}$–period of time passed until the arrival at glass transition temperature $T_{g,h}$), and $\Delta t_l$ is a period of time passed in the case of the application of a lower temperature increase rate (period of time passed until the arrival at crystallization completion temperature $T_{off,l}$–period of time passed until the arrival at glass transition temperature $T_{g,l}$). Thus, the production time is shortened by the application of a higher temperature increase rate. Contribution to the molding operation achievable on a larger scale in a shorter period of time is made by the decrease in the viscosity coefficient rather than the shortening of molding time attributable to the higher temperature increase rate.

In the process for producing a molded material according to the present invention, the heating step, at which a supercooled metallic glass material is heated to a temperature which is equal to or higher than its crystallization initiation temperature, is performed at a heating temperature that is preferably the minimum viscosity coefficient temperature or higher, and more preferably the crystallization completion temperature or higher, in view of the easiness of molding and the molding time.

In the process for producing the molded material according to the present invention, the heating step is performed preferably at a temperature increase rate of 0.5 K/s or more. The temperature increase rate is more preferably 3 K/s or more. A higher temperature increase rate in these cases elevates a temperature reached at a supercooled state, which lowers a minimum viscosity coefficient of the metallic glass material. This is the reason why the metallic glass material can undergo the molding operation at a much lower viscosity coefficient.

In the process for producing a molded material according to the present invention, the molding step preferred is subjecting the metallic glass material to transfer molding with the use of a concave-convex mold. The use of a mold in this case enables a precise shape control in producing the molded material, the material being produced with a desired shape in a relatively short period of time. The concave-convex mold has concavity-convexity that may be arranged either regularly or irregularly. The concave-convex mold has concavity-convexity that may be arranged continuously in one direction while having concavity-convexity repeatedly appear in a direction perpendicular thereto, or has concavity-convexity that may appear repeatedly in two directions perpendicular to each other. The use of the mold having periodic concavity-convexity would be able to produce wavefront control elements having periodic concavity-convexity.

In the use of the above-described mold, it is preferred for the heating step to be performed at a temperature increase rate which is equal to or higher than a temperature increase rate $\beta$, which is obtained from a formula below, wherein $\Delta L$ is a depth of concavity of the above-described mold used in the molding step; d is an aperture width of the concavity; P is a pressure applied in the molding step; $\beta$ is a temperature increase rate in the molding step; $T_{min}$ is a minimum viscosity coefficient temperature at a supercooled liquid state of the metallic glass material; $\eta(T_{min})$ is a viscosity coefficient at the $T_{min}$ of the metallic glass material; k is Boltzmann's constant; Q is an activation energy given in the approximation of the temperature dependence of the viscosity coefficient of a supercooled liquid of the metallic glass component to Arrhenius thermal activation; and A is a constant determined by a composition of an alloy and the temperature increase rate (A>1.5).

[Formula 1]

$$\Delta L = A \cdot \Delta L(T_{min}) \approx A \cdot \left[ \frac{Pd^2}{16\beta \cdot \eta(T_{min})} \cdot \left( \frac{kT_{min}^2}{Q} \right) \right]^{\frac{1}{2}} \quad (1)$$

The heating step performed in the above manner produces molded materials with a desired concavity-convexity shape, with certainty and accuracy.

Formula (1) can be determined in a following manner. Assuming concavity of the mold to be a tube extending in its depth direction and assuming the metallic glass material to be a viscous fluid flowing within the tube leads to the fulfillment of a Hagen-Poiseuille formula. Specifically, provided that d is an inner diameter of the tube (aperture width of concavity), P is a pressure applied to the viscous fluid, η is a viscosity coefficient of the viscous fluid (metallic glass material), v is a flow velocity at the time when the viscous fluid (metallic glass material) flows within the tube, and L is a flow amount of the viscous fluid (metallic glass material), Formula (2) will be obtained as a Hagen-Poiseuille formula.

[Formula 2]

$$P = 32\eta v \cdot \frac{L}{d^2} \quad (2)$$

wherein $$v = \left(\frac{dL}{dt}\right)$$

Formula (2) is a differential equation. By neglecting a minute viscous flow amount generated within a range from room temperature to $T_g$ during the temperature increase, and by assuming the temperature dependence of the viscosity coefficient at the supercooled liquid state from $T_g$ to minimum viscosity coefficient temperature $T_{min}$ to be approximate to the temperature dependence defined in the Arrhenius equation represented by Formula (3), solving Formula (2) results in deriving a viscous flow amount $\Delta L (T_{min})$, from $T_g$ to $T_{min}$, as Formula (4).

[Formula 3]

$$\eta = \eta_0 \exp\left(\frac{Q}{kT}\right) \quad (3)$$

[Formula 4]

$$\Delta L(T_{min}) \approx \left[\frac{Pd^2}{16\beta \cdot \eta(T_{min})} \cdot \left(\frac{kT_{min}^2}{Q}\right)\right]^{\frac{1}{2}} \quad (4)$$

It is generally difficult to accurately define, with a numerical formula, a total viscous flow amount $\Delta L$ present from $T_g$ to crystallization completion temperature $T_{off}$ which heavily depends on the crystallization process of the supercooled liquid occurring from its midpoint $T_{min}$ to $T_{off}$. However, using Formula (1) in view of $\Delta L = A \cdot \Delta L(T_{min})$, with a constant A (>1.5) given by considering the symmetry between the two crystallization processes, i.e., a process ranging from the initiation of the crystallization to the minimum viscosity state ($T_{on}$ to $T_{min}$) and a process ranging from the minimum viscosity state to the completion of the crystallization ($T_{min}$ to $T_{off}$), could provide the total viscous flow amount $\Delta L$. A is a constant determined by a composition of a metallic glass alloy and a temperature increase rate.

Relations of the parameters provided in Formula (1) are shown in FIG. 2. In Formula (1), increase in the temperature increase rate would heighten the minimum viscosity coefficient temperature $T_{min}$, according to FIG. 1, and would lower the minimum viscosity coefficient $\eta(T_{min})$, according to Non-Patent Literature 4. Consequently, $\Delta L$ increases.

In Formula (1), the depth of the concavity of the mold, $\Delta L$, refers to a height difference between the tip of the convexity of the mold and the deepest part of the concavity of the mold; and the aperture width of the concavity, d, in the case where concavities have a width (pitch between one inner wall and the other inner wall opposite thereto) varying in the depth direction, is an averaged width in the depth direction of the concavity.

In the process for producing a molded material according to the present invention, the metallic glass material may be composed of a Gd-based, Sm-based, Eu-based or Dy-based metallic glass material. In particular, the metallic glass material is preferably composed of $Gd_wCu_xAl_yB_z$ wherein w, x, y, z are each an atomic percentage satisfying $50 \leq w \leq 80$, $10 \leq x \leq 50$, $0 \leq y \leq 30$ and $0 \leq z \leq 10$. These compositions, due to the capability of Gd, Sm, Eu and Dy to absorb thermal neutrons better than other elements, are effective in terms of producing diffraction gratings for neutron beam interferometers. In particular, these compositions allow the molded material to be produced with a fine structure having a precisely controlled shape measuring not more than tens of micrometers, leading to the precise production of $G_2$ diffraction gratings for neutron Talbot interferometers. In the process for producing a molded material according to the present invention, the metallic glass material may be composed of a Pt-based, Au-based, Pd-based or Ni-based metallic glass material. These compositions, due to the capability of Pt, Au, Pd, Ni to absorb X-rays better than other elements, are effective in terms of producing diffraction gratings for X-ray interferometers. In particular, these compositions allow the molded material to be produced with a fine structure having a precisely controlled shape measuring not more than tens of micrometers, leading to the precise production of $G_2$ diffraction gratings for X-ray Talbot interferometers.

The molded material according to the present invention is composed of an alloy with the same composition as a composition of the metallic glass material, and has on its surface concavity-convexity with a pitch between adjacent convexities being in the order of nanometers or in the order of micrometers and a depth of the concavity being more than 10 μm.

The molded material according to the present invention, due to having a structure in which a pitch between adjacent convexities is in the order of nanometers or in the order of micrometers and a depth of the concavity is more than 10 μm, is employable in applications requiring fine structures measuring not more than tens of micrometers. Such a molded material having periodic concavity-convexity, for example, is employable as a wavefront control element. Such a molded material composed of an alloy with the same composition as a composition of a Gd-based, Sm-based, Eu-based or Dy-based metallic glass material is employable as a diffraction grating for a neutron beam interferometer. Such a molded material composed of an alloy with the same composition as a composition of a Pt-based, Au-based, Pd-based or Ni-based metallic glass material is employable as a diffraction grating for an X-ray interferometer. Such a molded material that fulfills the above-mentioned requirements and in addition defines a depth of concavity as not more than 110 μm and the concavity-convexity period as ranging from 0.4 μm to 90 μm is employable as a $G_2$ diffraction grating for a neutron Talbot interferometer or an X-ray Talbot interferometer. This diffraction grating may have concavity with not less than a depth of 1 μm or not less than a depth of 15 μm.

Advantageous Effects of the Invention

The present invention provides process for producing molded material by which a metallic glass material can be molded at a lower viscosity coefficient and a structure measuring not more than tens of micrometers can be molded with a highly precise shape control in a relatively short period of time; and the molded material, a wavefront control element and a diffraction grating are also provided.

DESCRIPTION OF EMBODIMENTS

Figure 1:
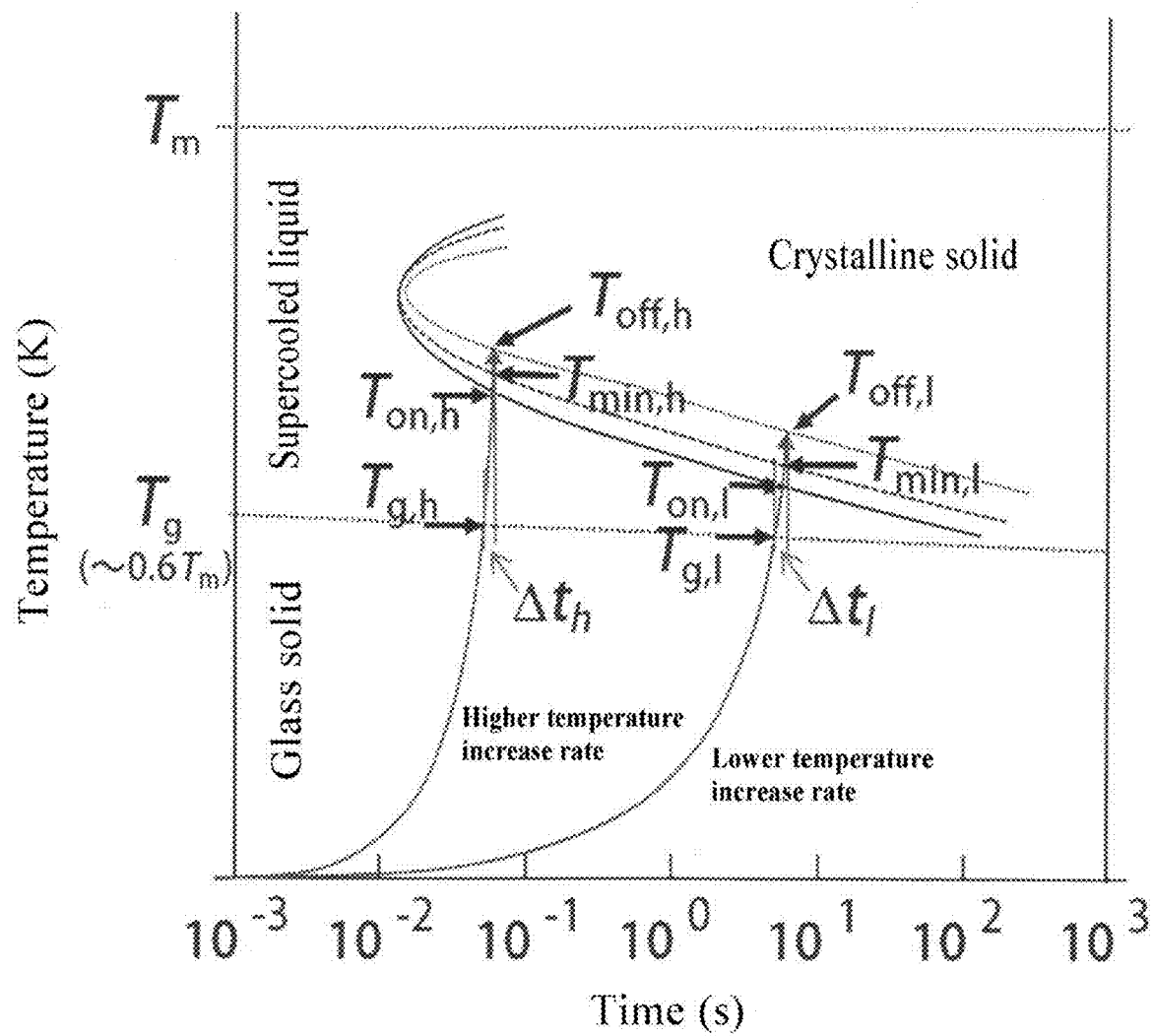
FIG. 1 is a graph showing relations between metallic glass material states with respect to temperature and elapsed time of heating.

Hereinafter, embodiments of the present invention will be described.

Process for producing molded material of embodiments of the present invention is a process which uses a metallic glass material to produce a molded material, a wavefront control element and a diffraction grating, which are embodiments of the present invention, and the process includes a heating step and a molding step.

The heating step is a step of heating a supercooled metallic glass material or solid metallic glass material to a temperature which is equal to or higher than a temperature at which a supercooled liquid of the metallic glass material starts to crystallize, in which the heating is performed preferably at a temperature increase rate of 0.5 K/s or more.

The molding step is a step performed during the heating step in which the metallic glass material is molded, for a period of time starting with the arrival at the glass transition temperature and lasting before a completion of a crystallization process of the supercooled liquid of the metallic glass material, into a material having a mixed phase of metallic glass and a crystalline phase or having a crystalline phase alone. At this time, the metallic glass material is preferably subjected to transfer molding using a concave-convex mold.

A composition of the metallic glass material is selected preferably considering a target molded material. For the production of $G_2$ diffraction gratings for neutron beam interferometers, in particular for neutron Talbot interferometers, the metallic glass material is preferably a Gd-based, Sm-based, Eu-based or Dy-based one in view of the capability of Gd, Sm, Eu, Dy to absorb thermal neutrons better than other elements. Such a metallic glass material may be the one that contains at least one component selected from Gd, Sm, Eu and Dy at an atomic ratio of 50% or more and at least one element capable of forming a eutectic crystal together with any of those elements that is selected from, for example, Ag, Al, Au, B, Bi, Cd, Co, Cu, Fe, Ga, Ge, Hg, In, Ir, Mg, Mn, Ni, Pb, Pd, Pt, Rh, Ru, Sb, Si, Sn, Te, Tl, Zn and Zr. Preferred in particular is the addition of B, which is capable of efficiently absorbing neutrons, in an amount not detrimental to the glass formability and the thermal stability at a supercooled liquid state.

For the production of $G_2$ diffraction gratings for X-ray interferometers, in particular for X-ray Talbot interferometers, for example, the metallic glass material is preferably a Pt-based, Au-based, Pd-based or Ni-based one, in view of the capability of Pt, Au, Pd, Ni to absorb X-rays better than other elements. Such a metallic glass material may be the one that contains at least one component selected from Pt, Au, Pd and Ni at an atomic ratio of 50% or more and at least one component capable of forming a eutectic alloy system together with any of those elements that is selected from, for example, Al, Am, As, B, Be, Bi, Ca, Ce, Cm, Er, Eu, Ga, Gd, Ge, Hf, Ho, In, La, Lu, Nb, Nd, P, Pb, Pr, Sb, Sc, Se, Si, Sn, Sr, Ta, Tb, Te, Th, Ti, Tm, Y, Yb and Zr.

The metallic glass material may take any form: for example, may be composed of a material given by directly supercooling an alloy liquid, or a metallic glass ribbon or metallic glass thin film given by rapidly quenching and solidifying an alloy liquid or by rapidly quenching and solidifying an alloy gas. The metallic glass material may be a metallic glass sheet given by thermal-spraying metallic glass powder prepared by an atomizing method. Crystalline substances with such a size or in such an amount as will not significantly inhibit the viscous flow of the supercooled liquid may be dispersed within the supercooled liquid or within its original metallic glass that has not been heated.

A mold used for the transfer molding in the molding step may be the one that has concavity-convexity arranged either regularly or irregularly. The mold may have concavity and convexity arranged continuously in one direction while having concavity-convexity repeatedly appear in a direction perpendicular thereto, or have convexity-convexity repeatedly in two directions perpendicular to each other. For the production of wavefront control elements and diffraction gratings that have periodic concavity-convexity, use of the mold having periodic concavity-convexity is preferred.

Hereinafter, actions and effects will be described.

The process for producing molded material of an embodiment of the present invention involves heating a supercooled metallic glass material lying under a temperature which is equal to or higher than its glass transition temperature to a temperature which is equal to or higher than its crystallization initiation temperature, and molding the metallic glass material at a lower viscosity, during the heating, for a period of time lasting before the completion of the crystallization process, into the material having a mixed phase of metallic glass and a crystalline phase or having a crystalline phase alone. This configuration enables a highly precise shape control at the time of the molding, giving rise to the molded material with a fine structure measuring not more than tens of micrometers, such as $G_2$ diffraction gratings for neutron Talbot interferometers and X-ray Talbot interferometers.

The process for producing molded material of embodiments of the present invention requires the metallic glass material to be molded while metallic glass material keeps a supercooled state, which inevitably shortens the production time. According to the process for producing molded material of embodiments of the present invention, increasing a temperature increase rate in the heating step elevates a temperature reached at a supercooled state, which in turn decreases a minimum viscosity coefficient of the metallic glass materials. This configuration enables the metallic glass materials to be molded at a lower viscosity coefficient. Subjecting the metallic glass materials to transfer molding with the use of a mold gives the molded materials a precisely controlled shape. The molded materials are produced with a desired shape in a relatively short period of time.

[Variation of Viscosity Coefficient of Metallic Glass Material During Temperature Increase]

A rapidly-quenched ribbon of metallic glass material $Gd_{60}Cu_{25}Al_{15}$ (at. %) was subjected to temperature increase at a constant rate of 0.67 K/s, during which the temperature dependence of the viscosity coefficient of the metallic glass material was measured. The measurement result is shown in FIG. 3.

Figure 2:
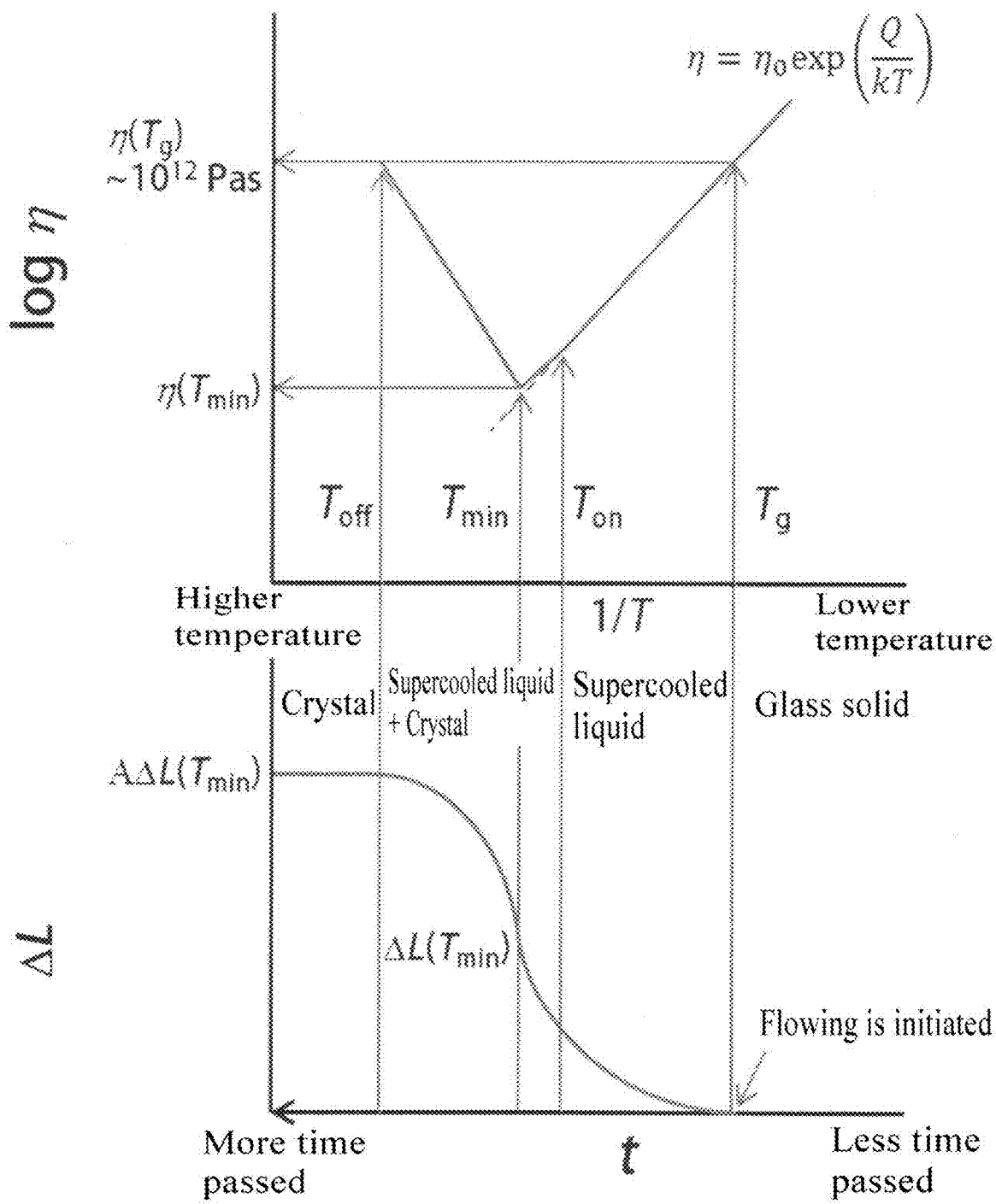
FIG. 2 is (a) a graph that, in heating a metallic glass material, shows a relation between a temperature T and a viscosity coefficient η of the metallic glass material, and (b) a graph that, in heating a metallic glass material, schematically shows a relation between an elapsed time of heating t and a flow amount ΔL of the metallic glass material.
Figure 3:
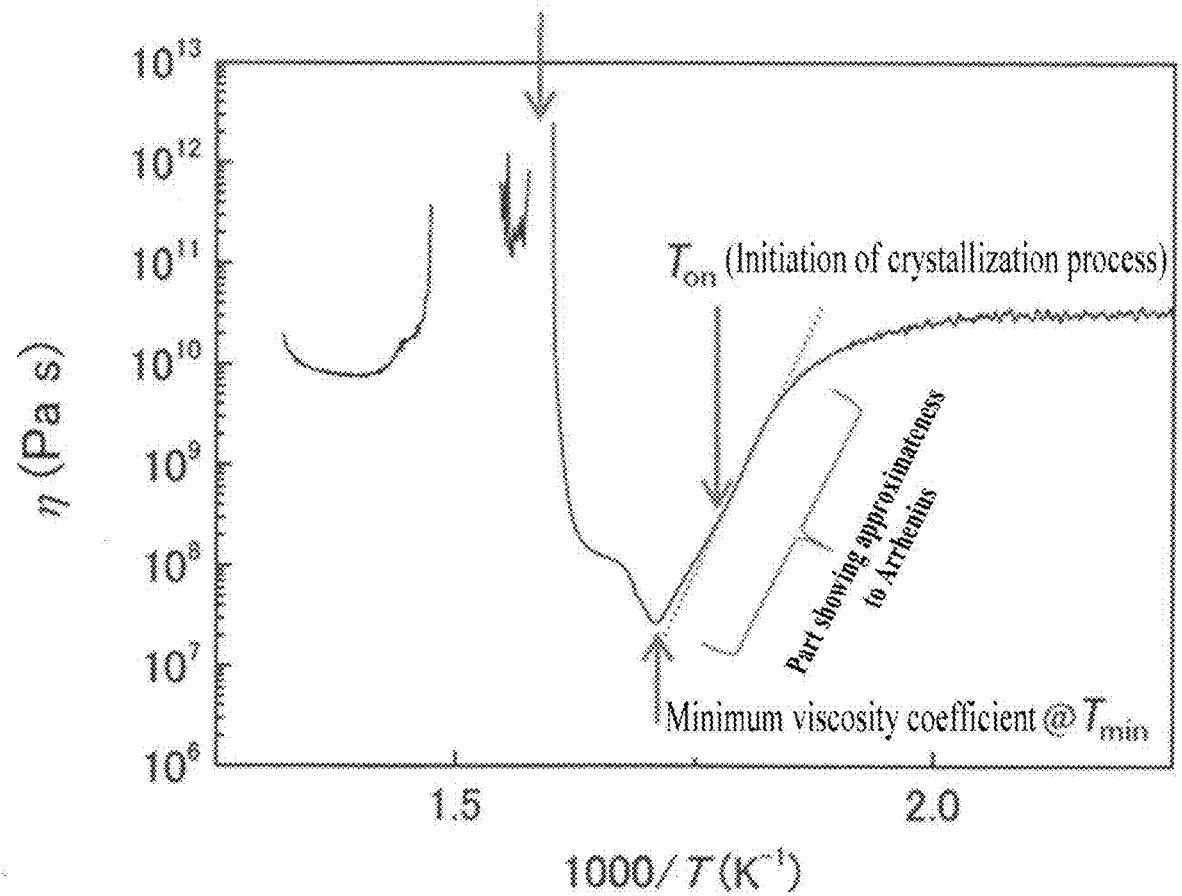
FIG. 3 is a graph that in heating a metallic glass material according to process for producing molded material of an embodiment of the present invention, shows a measurement result of a viscosity coefficient η of the metallic glass material with respect to a temperature T.

As shown in FIG. 3, the tens-of-K range falling before a minimum viscosity coefficient temperature $T_{min}$, although somewhat affected by a viscosity increase observed in the range beginning with $T_{on}$, fulfills a relation between reciprocal of temperature (1/T) and a logarithm of viscosity coefficient (log η) that takes a substantially linear form. This means that the temperature dependence of the viscosity coefficient at a supercooled state is as defined in the Arrhenius equation as represented in Formula (3). This verifies the fulfillments of the relations represented by Formula (1) and by FIG. 2 with high precision.

Example 1

The process for producing molded material of an embodiment of the present invention was applied to produce a diffraction grating for neutron beams. A metallic glass material used was a rapidly-quenched ribbon of $Gd_{60}Cu_{25}Al_{15}$ (at. %). The solid metallic glass material, while being heated at a constant temperature increase rate of not less than 3 K/s to a temperature which is equal to or higher than its crystallization initiation temperature (580 K), was subjected to transfer molding for a period of time starting with the arrival at the glass transition temperature of the metallic glass material and lasting before the arrival at the crystallization completion temperature of the metallic glass material.

Figure 4:
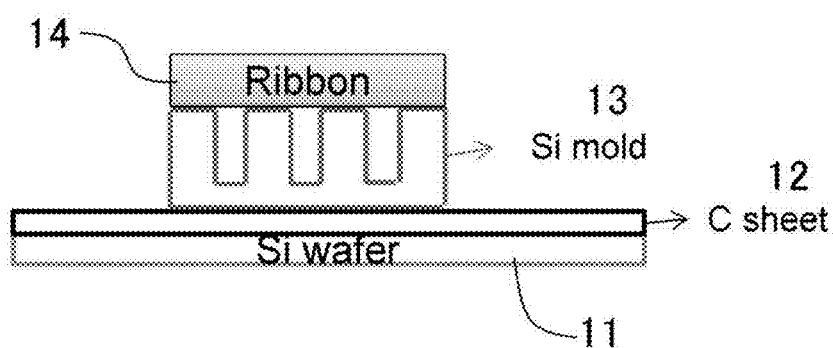
FIG. 4 is a side-view showing how transfer molding is performed in a molding step included in process for producing molded material of an embodiment of the present invention.

The transfer molding was performed with a configuration as shown in FIG. 4: on the surface of a Si wafer 11, a C sheet 12 was put, and thereon a Si mold 13 with concavity-convexity regularly arranged was put such that the concavity-convexity faced upward, and on the mold 13, a metallic glass material 14 ribbon was put, and pressure was applied at the time of molding so as to press the metallic glass material 14 to the mold 13. The same operation was adopted for transfer molding operations carried out in examples provided below.

As shown in FIGS. 5(a) and (b), the transfer molding operations performed with a pressure of 100 MPa and 50 MPa resulted in producing diffraction gratings whose concavity had a depth of 20 μm and 30 μm, respectively. Considering the successful filling to the depth of 30 μm at 50 MPa, the application of 100 MPa would not have been necessarily required for the molding to create a shallow depth of 20 μm, and even the application of 50 MPa would have been sufficient. These diffraction gratings had a pitch between adjacent convexities (width of concavity) of 4 μm and a concavity-convexity period of 9 μm.

Figure 5:
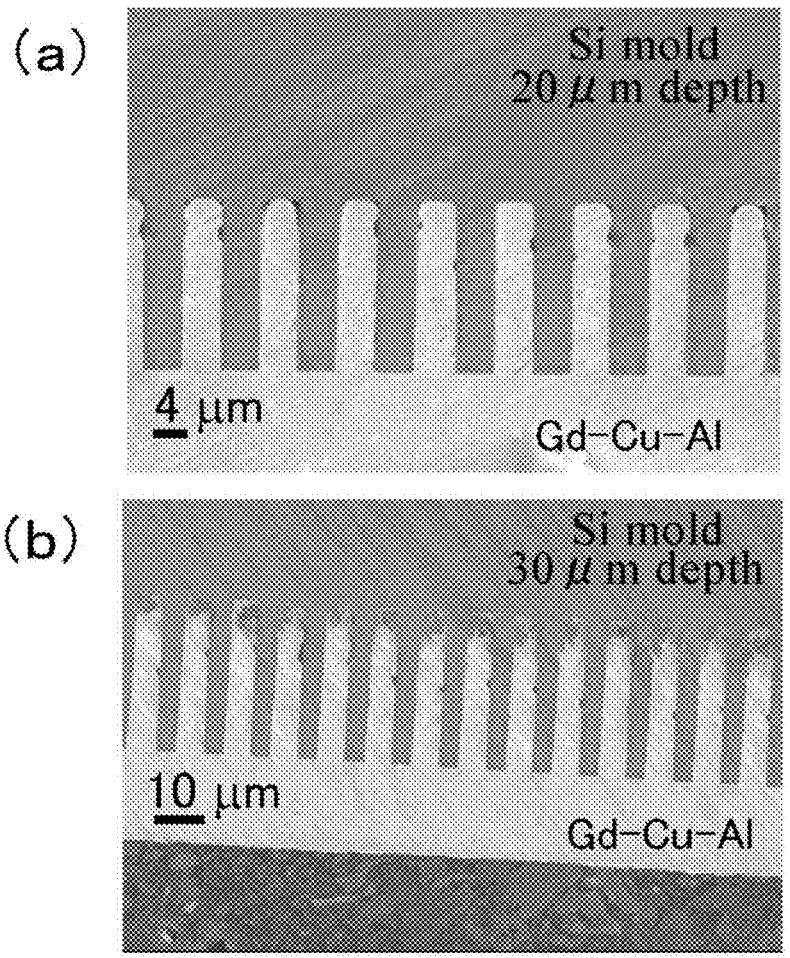
FIG. 5 shows photomicrographs of diffraction gratings produced according to process for producing molded material of an embodiment of the present invention and using a $Gd_{60}Cu_{25}Al_{15}$ (at. %) metallic glass material, in which loads applied at the time of transfer molding are (a) 100 MPa and (b) 50 MPa.
Figure 6:
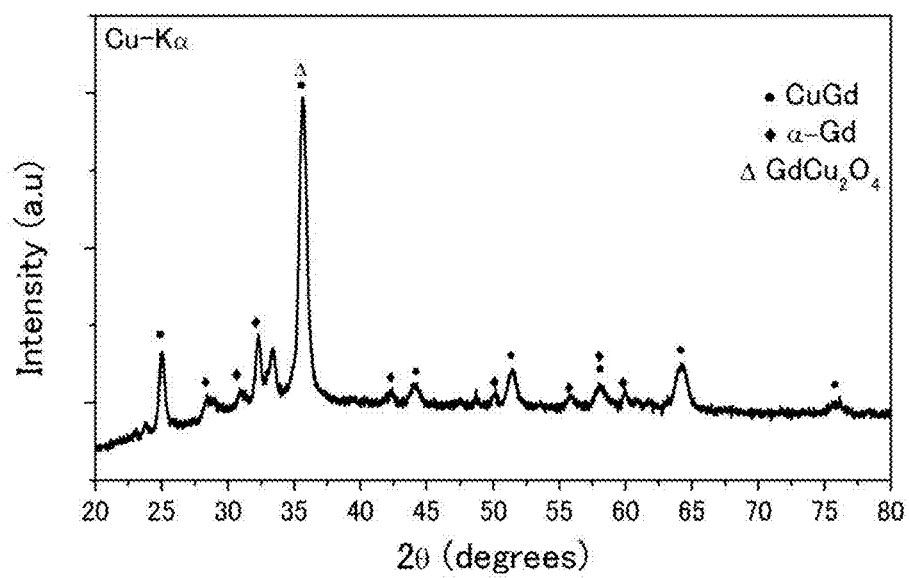
FIG. 6 shows an X-ray diffraction spectrum of the molded metal (diffraction grating) shown in FIG. 5(a).

FIG. 6 shows the result of an X-ray diffraction of the resultant molded metal (diffraction grating) shown in FIG. 5(a). FIG. 6 verifies the formation of an alloy from the metallic glass raw material. It is considered from the results of FIG. 5 and FIG. 6 that the resultant diffraction gratings having periodic concavity-convexity and composed of a Gd-based alloy are optimal for $G_2$ diffraction gratings for neutron Talbot interferometers.

Example 2

The process for producing molded material of an embodiment of the present invention was applied to produce a diffraction grating for X-rays. A metallic glass material used was a rapidly-quenched ribbon of $Pt_{60}Ni_{15}P_{25}$ (at. %). The solid metallic glass material, while being heated at an average temperature increase rate of not less than 2.5 K/s to a temperature (620 to 630 K) higher than its crystallization initiation temperature (570 K), was subjected to transfer molding for a period of time starting with the arrival at the glass transition temperature of the metallic glass material and lasting before the arrival at the crystallization completion temperature of the metallic glass material.

The diffraction gratings produced are shown in FIGS. 7(a)-(c).

FIG. 7(a) shows a diffraction grating that was produced at an average temperature increase rate of 2.5 K/s and at a pressure applied at the transfer molding of 5 kN, and that has concavity whose depth is 100 μm with a pitch between adjacent convexities (width of concavity) being about 10 μm and a concavity-convexity period being about 65 μm. In this instance, a period of time from the initiation of temperature increase until the completion of the transfer molding was about 140 seconds.

FIG. 7(b) shows a diffraction grating that was produced at an average temperature increase rate of 3.4 K/s and at a pressure applied at the transfer molding of 2 kN, and that has concavity whose depth is 50 μm with a pitch between adjacent convexities (width of concavity) being about 20 μm and a concavity-convexity period being about 84 μm. In this instance, a period of time from the initiation of temperature increase until the completion of the transfer molding was about 380 seconds.

FIG. 7(c) shows a diffraction grating that was produced at an average temperature increase rate of 3.2 K/s and at a pressure applied at the transfer molding of 1 kN, and that has concavity whose depth is 50 μm with a pitch between adjacent convexities (width of concavity) being about 8 μm and a concavity-convexity period being about 67 μm. In this instance, a period of time from the initiation of temperature increase until the completion of the transfer molding was about 480 seconds.

Figure 7:
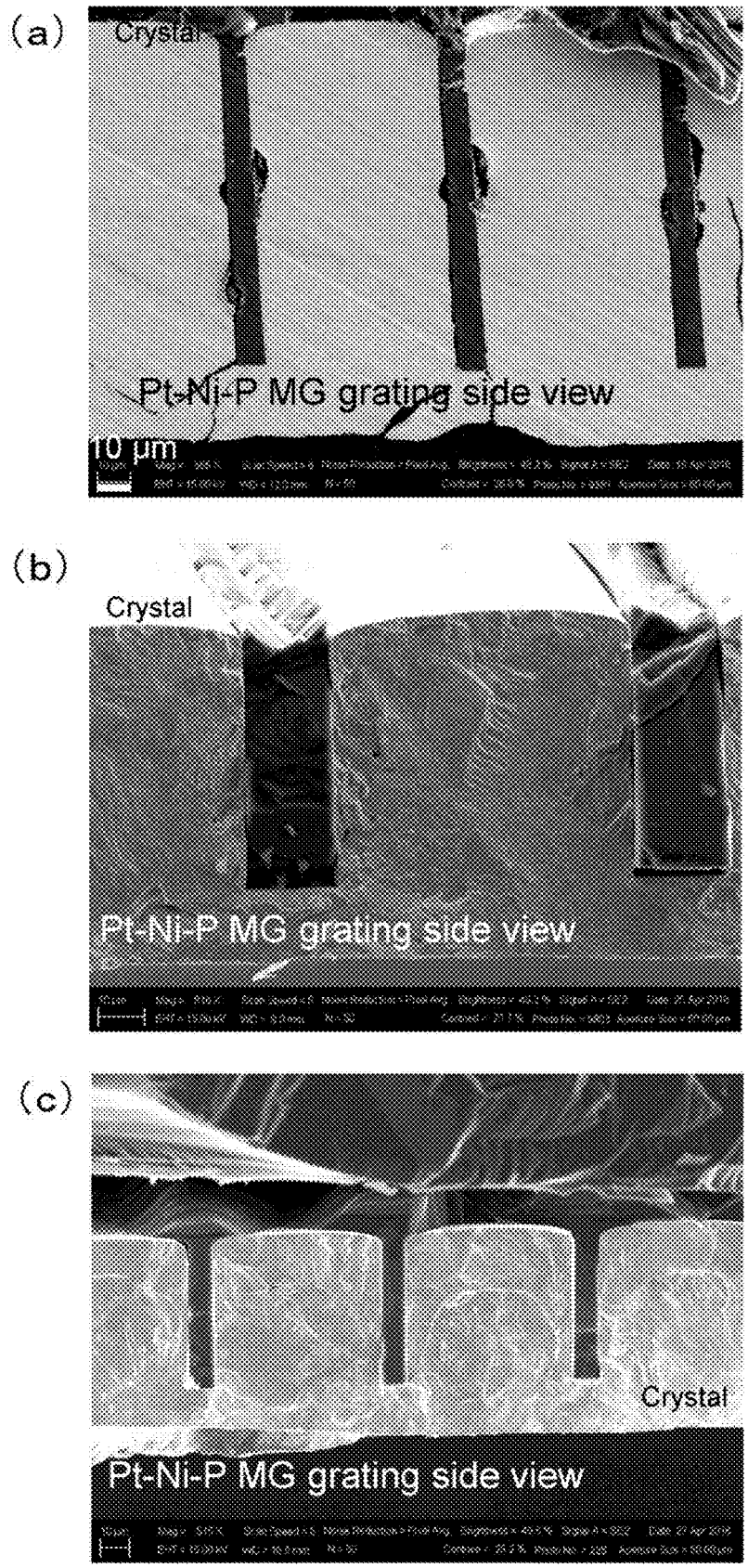
FIG. 7 shows photomicrographs of diffraction gratings produced according to process for producing molded material of an embodiment of the present invention and using a $Pt_{60}Ni_{15}P_{25}$ (at. %) metallic glass material, in which (a) an average temperature increase rate is 2.5 K/s and a pressure applied at the time of transfer molding is 5 kN, (b) an average temperature increase rate is 3.4 K/s and a pressure applied at the time of transfer molding is 2 kN, and (c) an average temperature increase rate is 3.2 K/s and a pressure applied at the time of transfer molding is 1 kN.
Figure 8:
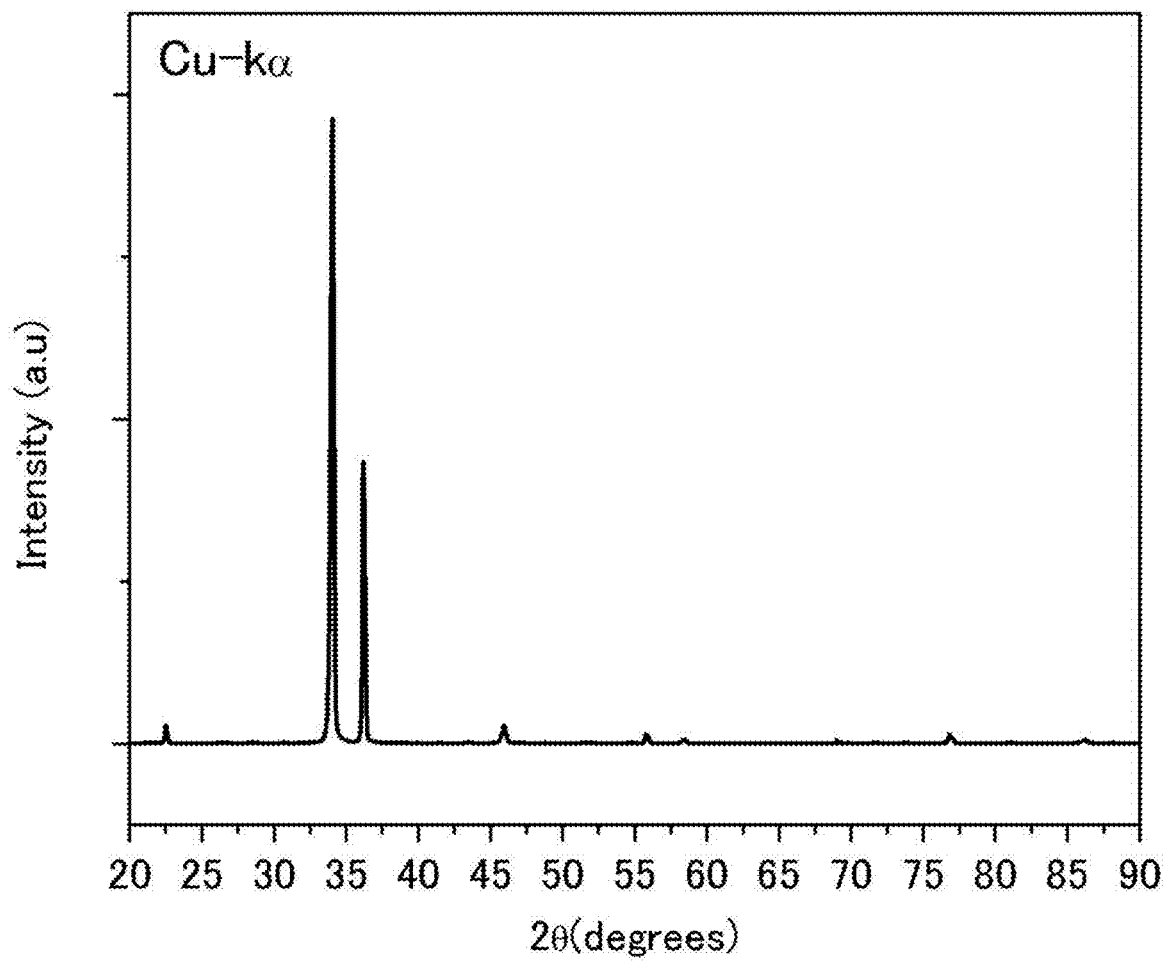
FIG. 8 shows an X-ray diffraction spectrum of the molded metal (diffraction grating) shown in FIG. 7(a).

FIG. 8 shows the result of X-ray diffraction for the resultant molded metal (diffraction grating) shown in FIG. 7(a). FIG. 8 verifies the formation of an alloy from the metallic glass raw material. It is considered from the results of FIG. 7 and FIG. 8 that the resultant diffraction gratings having periodic concavity-convexity and composed of a Pt-based alloy are optimal for $G_2$ diffraction gratings for X-ray Talbot interferometers.

Example 3

The process for producing molded material of an embodiment of the present invention was applied to produce a diffraction grating for X-rays. A metallic glass material used was prepared by stacking three rapidly-quenched ribbons of $Pd_{42.5}Ni_{7.5}Cu_{30}P_{20}$ (at. %). The solid metallic glass material (thickness: not more than 120 μm), while being heated at an average temperature increase rate of 5 K/s to a temperature (623 K) higher than its crystallization initiation temperature (610 K), was subjected to transfer molding for a period of time starting with the arrival at the glass transition temperature of the metallic glass material and lasting before the arrival at the crystallization completion temperature of the metallic glass material.

Figure 9:
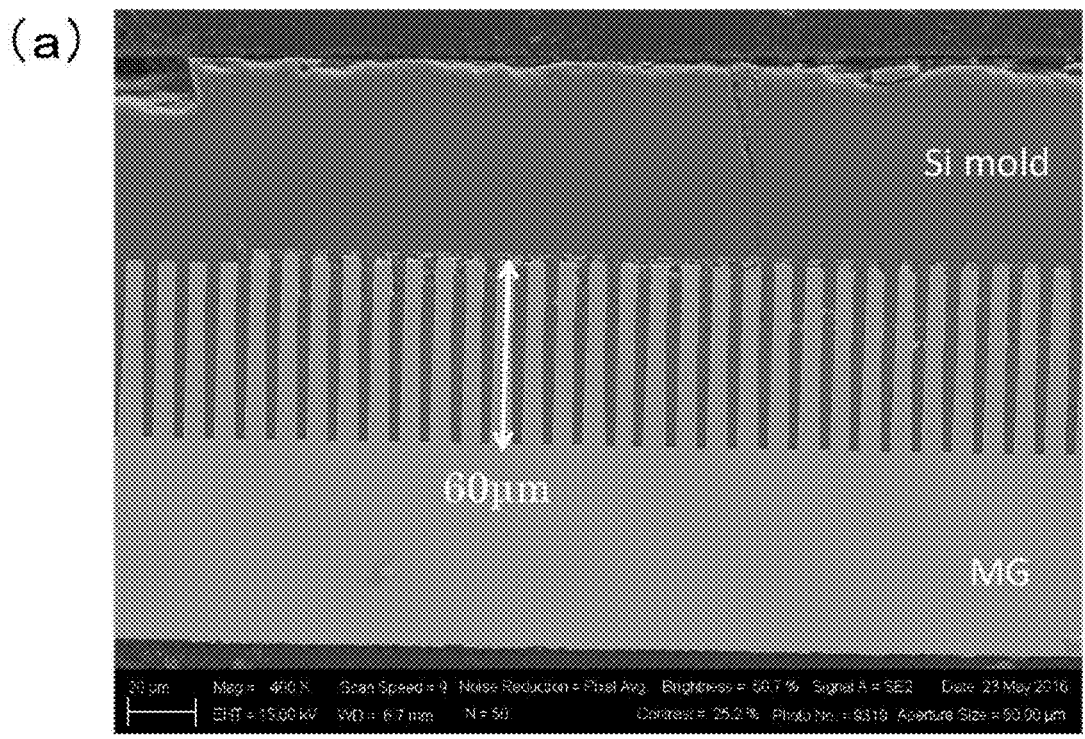
FIG. 9 shows (a) a photomicrograph and (b) an X-ray diffraction spectrum, of a molded metal (diffraction grating) produced according to process for producing molded material of an embodiment of the present invention and using a $Pd_{42.5}Ni_{7.5}Cu_{30}P_{20}$ (at. %) metallic glass material, in which an average temperature increase rate is 5 K/s and a pressure applied at the time of transfer molding is 20 MPa.
Figure 9:
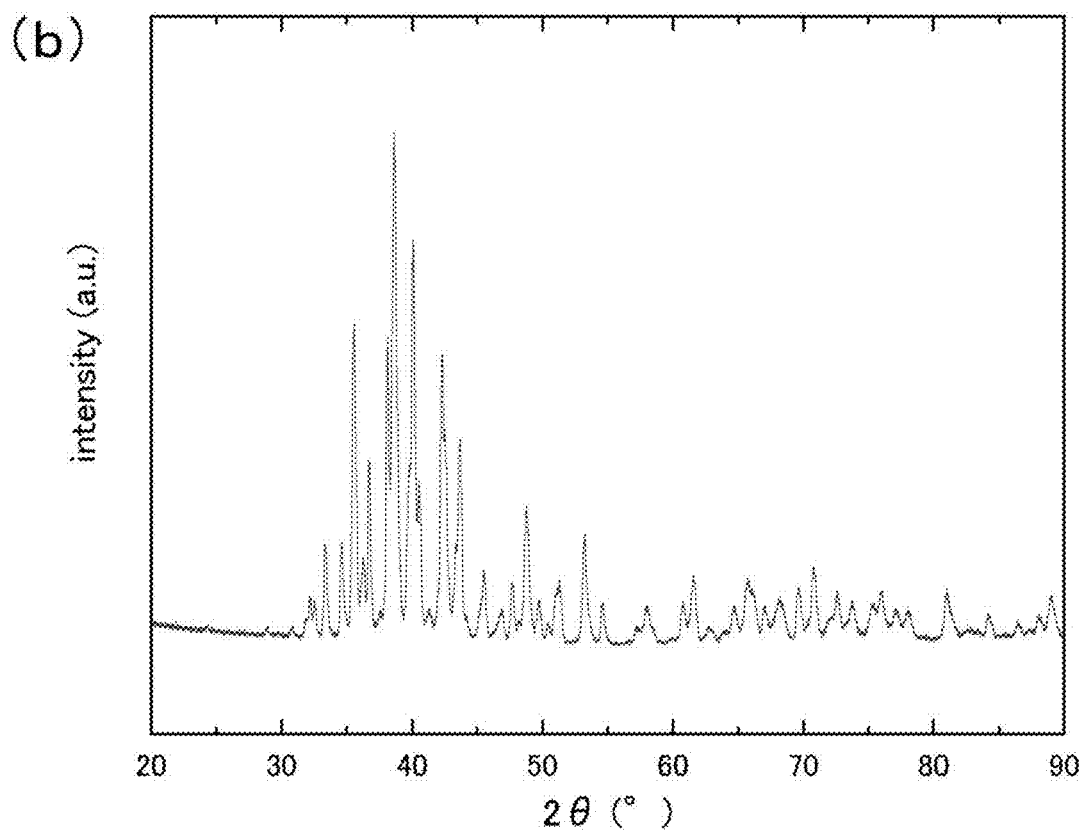

The diffraction grating produced is shown in FIG. 9(a). FIG. 9(a) shows that the resultant diffraction grating had concavity whose depth was 60 μm with a pitch between adjacent convexities (width of concavity) being about 5 μm, and a concavity-convexity period being about 10 μm. A pressure at the time of the transfer molding was 20 MPa, and a period of time from the initiation of temperature increase until the completion of the transfer molding was about 180 seconds.

The result of X-ray diffraction for the resultant molded metal (diffraction grating) is shown in FIG. 9(b). FIG. 9(b) verifies the formation of an alloy from the metallic glass raw material. It is considered from the results of FIGS. 9(a) and (b) that the resultant diffraction gratings having periodic concavity-convexity and composed of a Pt-based alloy are optimal for $G_2$ diffraction gratings for X-ray Talbot interferometers.

Example 4

The process for producing molded material of an embodiment of the present invention was applied to produce a diffraction grating for X-rays. A metallic glass material used was a rapidly-quenched ribbon of $Pd_{42.5}Ni_{7.5}Cu_{30}P_{20}$ (at. %) (average thickness: 40 μm). The solid metallic glass material, while being heated by laser at an average temperature increase rate of 1.67 K/s to a temperature (603 K) higher than its crystallization initiation temperature (590 K), was subjected to transfer molding for a period of time starting with the arrival at the glass transition temperature of the metallic glass material and lasting before the arrival at the crystallization completion temperature of the metallic glass material.

Figure 10:
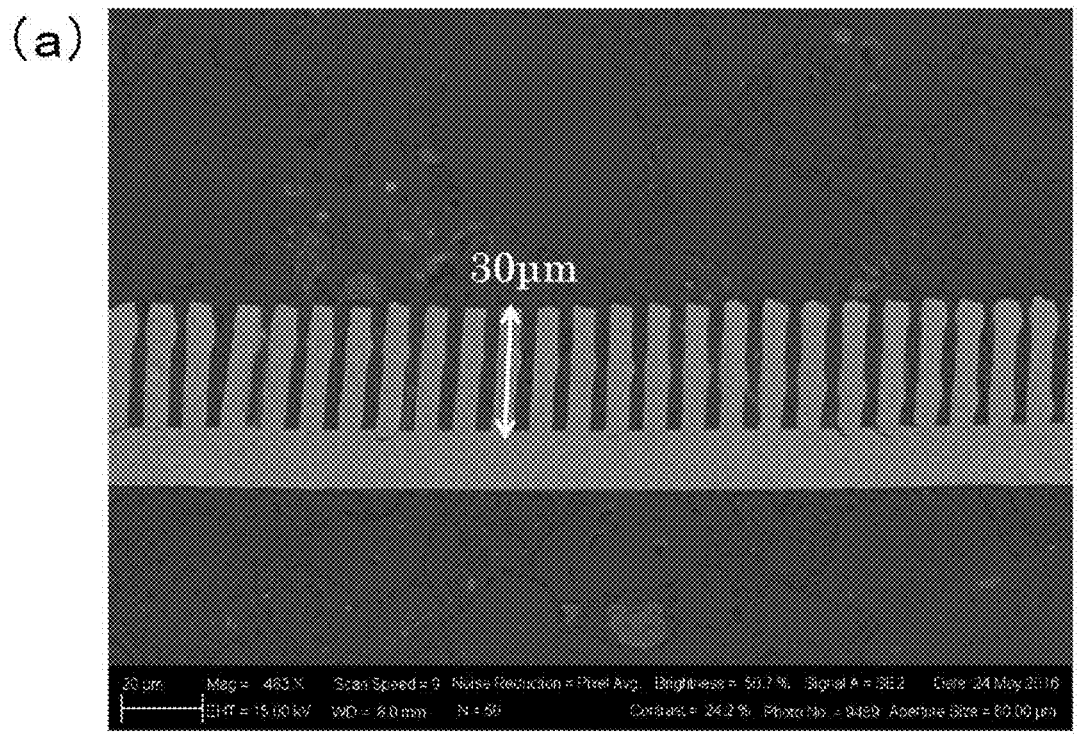
FIG. 10 shows (a) a photomicrograph and (b) an X-ray diffraction spectrum, of a molded metal (diffraction grating) produced according to process for producing molded material of an embodiment of the present invention and using a $Pd_{42.5}Ni_{7.5}Cu_{30}P_{20}$ (at. %) metallic glass material, in which an average temperature increase rate in laser heating is 1.67 K/s and a pressure applied at the time of transfer molding is 40 MPa.
Figure 10:
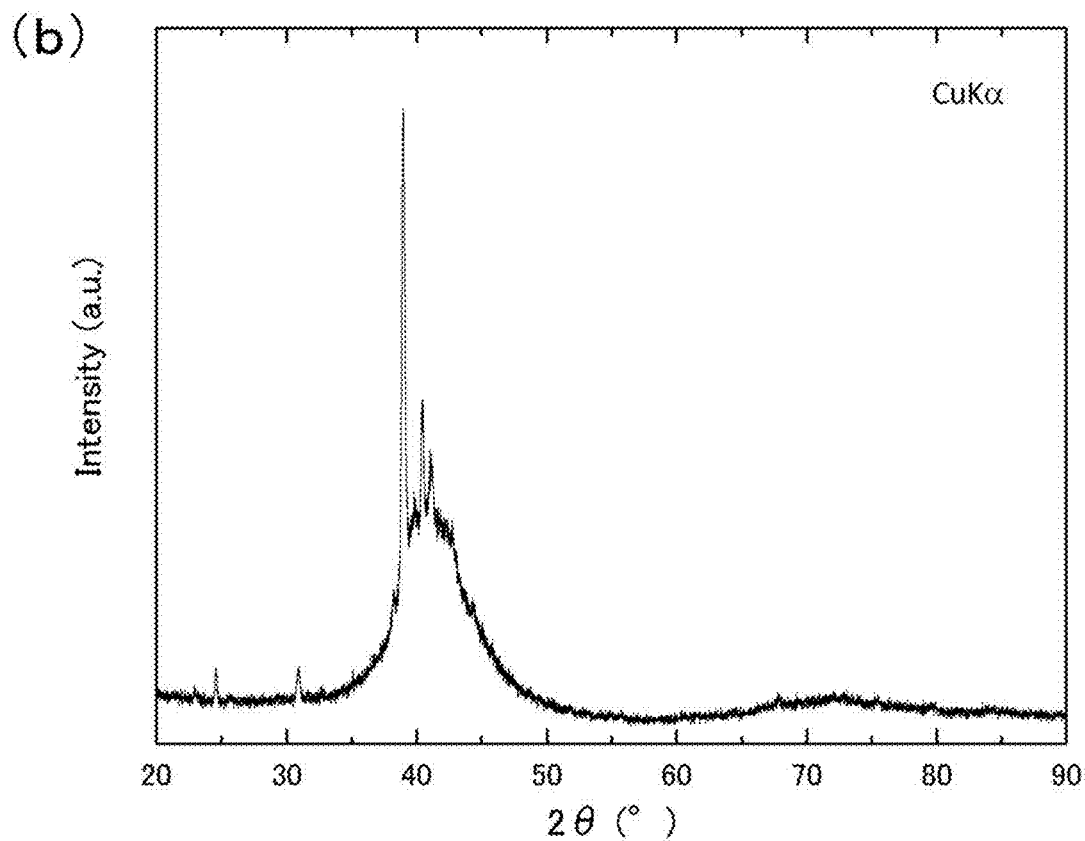

The diffraction grating produced is shown in FIG. 10(a). FIG. 10(a) shows that the diffraction grating produced through laser heating had concavity whose depth was 30 μm with a pitch between adjacent convexities (width of concavity) being about 4 μm and a concavity-convexity period being about 10 μm. A pressure applied at the time of the transfer molding was 40 MPa, and a period of time from the initiation of temperature increase until the completion of the transfer molding was about 100 seconds.

The result of X-ray diffraction for the resultant molded metal (diffraction grating) is shown in FIG. 10(b). FIG. 10(b) verifies the formation of an alloy from the metallic glass raw material even in the case of laser heating. It is considered from the results of FIGS. 10(a) and (b) that the resultant diffraction gratings having periodic concavity-convexity and composed of a Pt-based alloy are optimal for $G_2$ diffraction gratings for X-ray Talbot interferometers.

Example 5

The process for producing molded material of an embodiment of the present invention was applied to produce a diffraction grating for X-rays. A metallic glass material used was a bulk of $Ni_{50}Pd_{30}P_{20}$ (at. %) (thickness: 1.5 mm, diameter: 30 mm). The solid metallic glass material, while being heated at an average temperature increase rate of 0.67 K/s to a temperature (675 K) higher than its crystallization initiation temperature (668 K), was subjected to transfer molding for a period of time starting with the arrival at the glass transition temperature of the metallic glass material and lasting before the arrival at the crystallization completion temperature of the metallic glass material.

Figure 11:
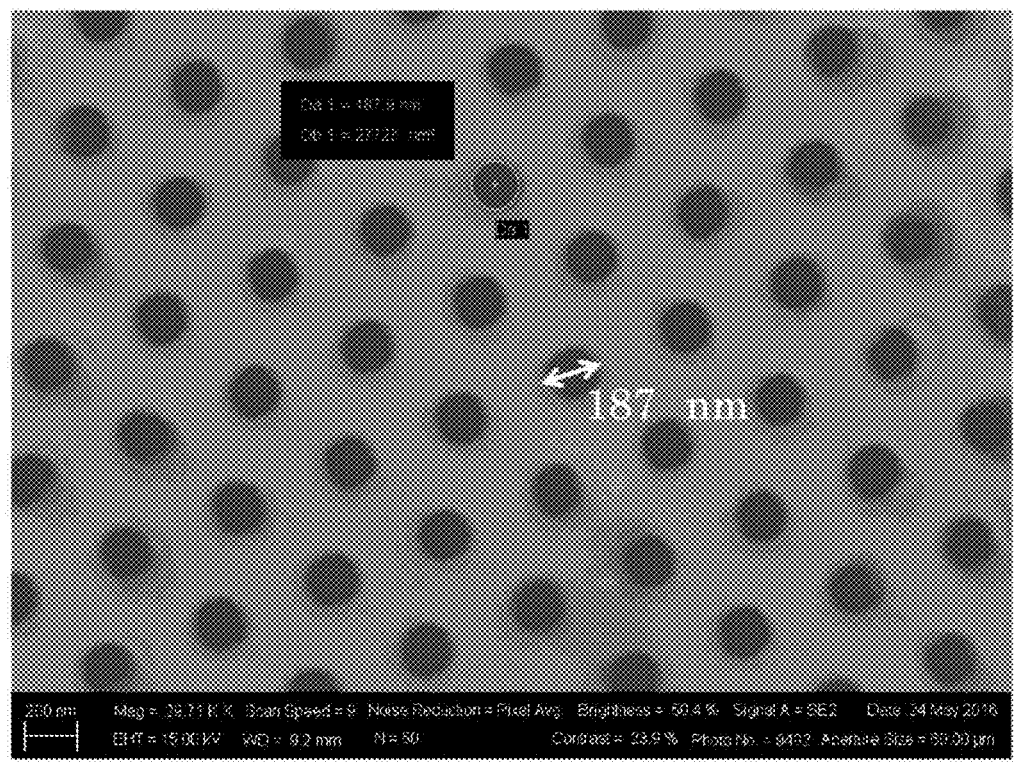
FIG. 11 shows (a) a photomicrograph and (b) an X-ray diffraction spectrum, of a molded metal (diffraction grating) produced according to process for producing molded material of an embodiment of the present invention and using a $Ni_{50}Pd_{30}P_{20}$ (at. %) metallic glass material, in which an average temperature increase rate is 0.67 K/s and a pressure applied at the time of transfer molding is 20 MPa.
Figure 11:
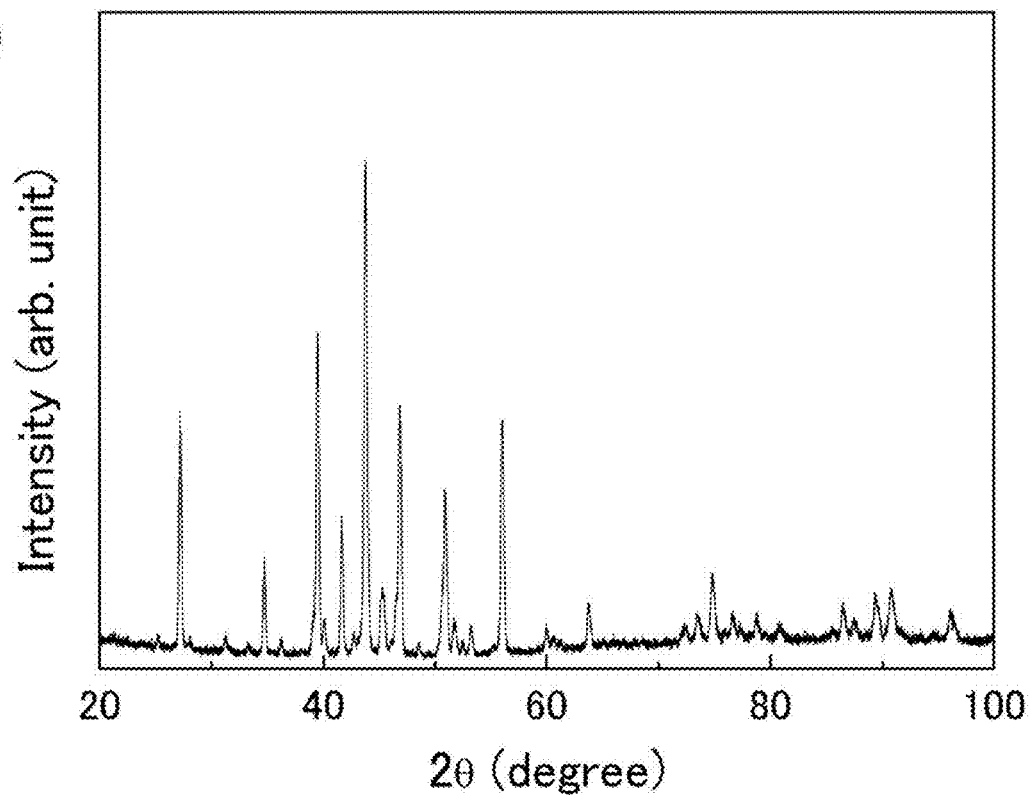

The diffraction grating produced is shown in FIG. 11(a). FIG. 11(a) shows the resultant diffraction grating having a columnar convexity with a diameter of 187 nm on a lattice point of a hexagonal lattice with a length of its one side measuring about 450 nm. A pressure applied at the time of the transfer molding was 20 MPa, and a period of time from the initiation of temperature increase until the completion of the transfer molding was about 180 seconds.

The result of an X-ray diffraction for the resultant molded metal (diffraction grating) is shown in FIG. 11(b). FIG. 11(b) verifies the formation of an alloy from the metallic glass raw material. It is considered from the results of FIGS. 11(a) and (b) that the resultant diffraction gratings having periodic concavity-convexity and composed of a Ni-based alloy are optimal for $G_2$ diffraction gratings for X-ray Talbot interferometers.

REFERENCE SIGNS LIST

11: Si wafer
12: sheet
13: mold
14: metallic glass material

The invention claimed is:

1. A molded material being a diffraction grating, which comprises a Gd-based, Sm-based, Eu-based, Dy-based, Pt-based, Au-based, Pd-based or Ni-based alloy composition capable of being produced as a metallic glass material and which has on a surface thereof a periodic concavity-convexity having a depth of the concavity being 20 µm or more and not more than 110 µm, and a Period of the concavity-convexity ranging from 0.4 µm to 90 µm, the molded material being produced by a process comprising:
    a step of heating a supercooled metallic glass material to a temperature which is equal to or higher than a temperature at which a supercooled liquid of the metallic glass material starts to crystallize;
    and a step of molding the metallic glass material, during the heating step, for a period of time lasting before a completion of a crystallization process of the supercooled liquid of the metallic glass material, into the material having a mixed phase of metallic glass and a crystalline phase or having a crystalline phase alone,
    wherein the step of heating is performed by beating at a temperature increase rate of 0.5 K/s or more and 5 K/s or less.

2. A molded material in the form of a diffraction grating which comprises a Gd-based, Sm-based, Eu-based, Dy-based, Pt-based, Au-based, Pd-based or Ni-based alloy composition capable of being produced as a metallic glass material and which has on a surface thereof a periodic concavity-convexity having a depth of the concavity being 20 µm or more and not more than 110 µm and a period of the concavity-convexity ranging from 0.4 µm to 90 µm.

3. A wavefront control element comprising the molded material according to claim 2.

4. A molded material being a diffraction grating, which comprises a Gd-based, Sm-based, Eu-based, Dy-based, Pt-based, Au-based, Pd-based or Ni-based alloy composition capable of being produced as a metallic glass material and which has on a surface thereof a periodic concavity-convexity having a depth of the concavity being 20 µm or more and not more than 110 µm, and a period of the concavity-convexity ranging from 0.4 µm to 90 µm, the molded material being produced by a process comprising:
    a step of heating a solid metallic glass material to a temperature which is equal to or higher than a glass transition temperature of the metallic glass material and is equal to or higher than a temperature at which the metallic glass material starts to crystallize;
    and a step of molding the metallic glass material, during the heating step, for a period of time starting with an arrival at the glass transition temperature and lasting before a completion of a crystallization process of a supercooled liquid of the metallic glass material, into the material having a mixed phase of metallic glass and a crystalline phase or having a crystalline phase alone,
    wherein the step of heating is performed by heating at a temperature increase rate of 0.5 K/s or more and 5 K/s or less.

* * * * *